(12) United States Patent  
Francis, Jr. et al.

(10) Patent No.: US 8,447,863 B1  
(45) Date of Patent: May 21, 2013

(54) SYSTEMS AND METHODS FOR OBJECT RECOGNITION

(75) Inventors: Anthony G. Francis, Jr., San Jose, CA (US); Arshan Poursohi, Berkeley, CA (US)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 13/465,453

(22) Filed: May 7, 2012

Related U.S. Application Data

(60) Provisional application No. 61/483,291, filed on May 6, 2011, provisional application No. 61/596,995, filed on Feb. 9, 2012.

(51) Int. Cl.  
*G06F 7/00* (2006.01)

(52) U.S. Cl.  
USPC ........... 709/226; 709/224; 709/201; 709/223; 709/227; 709/245; 707/724; 707/736; 707/769; 707/770

(58) Field of Classification Search  
USPC .................. 709/226, 224, 201, 223, 227, 245  
See application file for complete search history.

(56) References Cited

U.S. PATENT DOCUMENTS

| | | | |
|---|---|---|---|
| 5,144,685 A | 9/1992 | Nasar et al. | |
| 5,378,969 A | 1/1995 | Haikawa | |
| 7,693,757 B2 | 4/2010 | Zimmerman | |
| 8,001,116 B2 * | 8/2011 | Cope | 707/724 |
| 8,065,254 B1 * | 11/2011 | Das et al. | 706/46 |
| 2010/0076631 A1 | 3/2010 | Mian | |
| 2010/0155156 A1 | 6/2010 | Finkelstein | |
| 2011/0047516 A1 * | 2/2011 | Pavan et al. | 715/853 |
| 2012/0095819 A1 * | 4/2012 | Li | 705/14.23 |

* cited by examiner

*Primary Examiner* — Jude Jean Gilles  
(74) *Attorney, Agent, or Firm* — McDonnell Boehnen Hulbert & Berghoff LLP

(57) ABSTRACT

Examples disclose systems and methods for recognizing objects. A method may be executable to receive a query from a robot. The query may include identification data associated with an object and contextual data associated with the object. The query may also include situational data. The method may also be executable to identify the object based at least in part on the data in the query received from the robot. Further, the method may be executable to send data associated with the identified object to the robot in response to the query.

10 Claims, 11 Drawing Sheets

SYSTEMS AND METHODS FOR OBJECT RECOGNITION

CROSS-REFERENCE TO RELATED APPLICATIONS

This patent application claims priority to U.S. Application No. 61/483,291, filed on May 6, 2011, and U.S. Application No. 61/596,995, filed Feb. 9, 2012, the contents of each of which are entirely incorporated herein by reference, as if fully set forth in this application.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software for collecting commands from the user and interpreting the commands into commands on the servers. The servers may handle the computing, and can either store or retrieve information from database servers or file servers and display an updated page to the user. Through "cloud computing", data across multiple servers can be synchronized around the world allowing for collaborative work on one file or project by multiple users around the world, for example.

SUMMARY

The present application discloses, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, many types of devices may be used or configured to perform logical functions in any of the processes or methods described herein.

In yet further examples, many types of devices may be used or configured as means for performing functions of any of the methods described herein (or any portions of the methods described herein).

For example, a method may include receiving a query from a robot. The query may comprise (i) identification data associated with an object and (ii) contextual data associated with the object. The method may also include identifying the object based at least in part on the data in the query received from the robot. Furthermore, the method may include sending data associated with the identified object to the robot in response to the query.

In another example, a device may include a non-transitory computer-readable medium and program instructions stored on the non-transitory computer-readable medium and executable by at least one processor to perform a number of steps. The steps may include receiving a query from a robot, wherein the query may comprise contextual data associated with a location of the object. The steps may also include identifying the object based at least in part on the data in the query received from the robot and sending data associated with the identified object to the robot in response to the query.

Another example may include a non-transitory computer-readable medium having stored thereon instructions executable by a computing device to cause the computing device to perform a number of functions. The functions may include receiving a query from a robot, wherein the query may include identification data associated with an object and contextual data associated with a location of the object. The functions may also include identifying the object based at least in part on the data in the query received from the robot. Moreover, the functions may determine a probability that the identified object is the object of the query received from the robot and, if the probability exceeds a threshold, send data associated with the identified object to the robot in response to the query.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
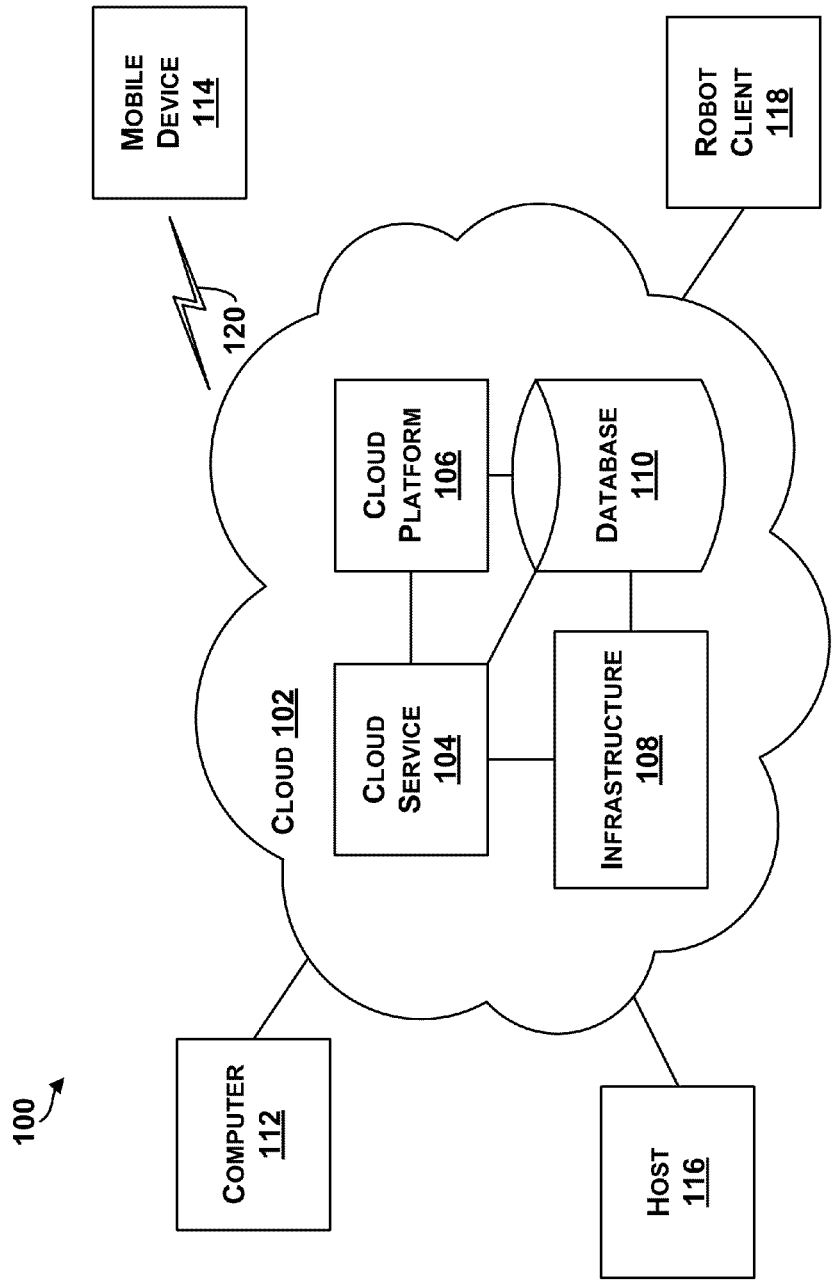
FIG. 1 is an example system for cloud-based computing.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may describe, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from a robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition by and/or control of a robot. A robot may perform any actions or queries to the cloud as described herein based on contextual or situational information.

In some examples, rather than require a robot's knowledge base to be stored onboard the robot, some embodiments enable robots to store and access data at an external location, such as on a server and/or other computing device. The external location may receive data and/or or requests from one or more robots. A server may store received data from one or more robots and/or distribute all or part of the stored data to one or more robots so as to create a common knowledge base amongst the robots, where robots can obtain instructions and/or data.

In some embodiments, a robot may have information relating to an object and/or area in which the robot operates. The area may be associated with a map, location, etc. The robot may send the information relating to the area to a server, which may include an object recognition system to identify objects associated with the information from the robot.

The robot and/or server may use contextual analysis to determine and identify objects. For example, if the robot is in an office, the robot may access an "office" database of objects to perform recognitions. As another example, the robot may operate with situational awareness such that a robot may inventory objects in a scene, and if given a command by a user, the robot can determine the content or interpret the meaning of the command based on a situation of the scene or by comparing with objects in the scene. For example, the robot may receive a command to retrieve a soda from the refrigerator. The robot may send the command to the server as an input or may optionally use the robot's database of the area to recognize the refrigerator and the soda, for example. Optionally, the robot may send the command to the server, which may recognize the refrigerator and the soda. In embodiments, the robot and/or server may use contextual as well as situational data to recognize the object. Moreover, once the object is recognized, the server may determine an interaction associated with the command and identify one or more computer executable instructions that the robot may execute to perform the interaction, for example.

1. Cloud Computing Architecture

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices, thereby taking advantage of the server devices' processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device with a transmitter/receiver including a laptop computer, a mobile telephone, etc., that is configured to transmit/receive data to/from the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, sonar, optical sensors, biosensors, Radio Frequency identification (RFID) systems, Near Field Communication (NFC) chip, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
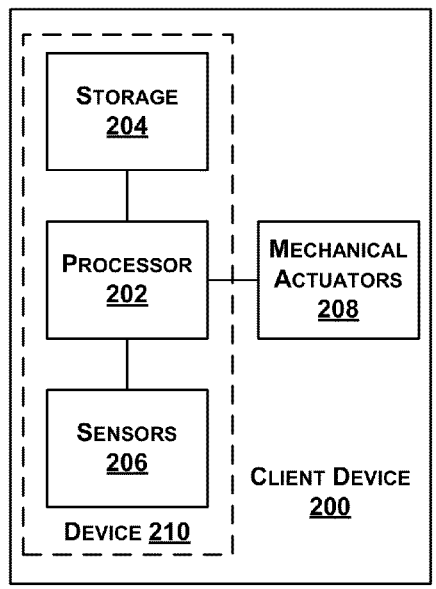
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone, smartphone, tablet computer, etc. to function as the "brains" or control components of the robot. The device 210 may be considered a module of the robot. The device 210 may be physically attached to the robot. For example, a smartphone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a smartphone to download the routine from the cloud, and when the smartphone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone, smartphone, tablet computer, etc.), which can provide additional peripheral components to the device 200, such as any of an accelerometer, gyroscope, compass, GPS, camera, WiFi connection, a touch screen, etc., that are included within the device 210.

Figure 2B:
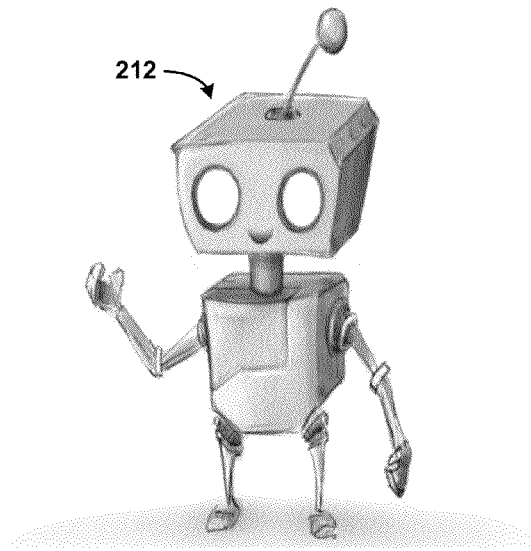
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
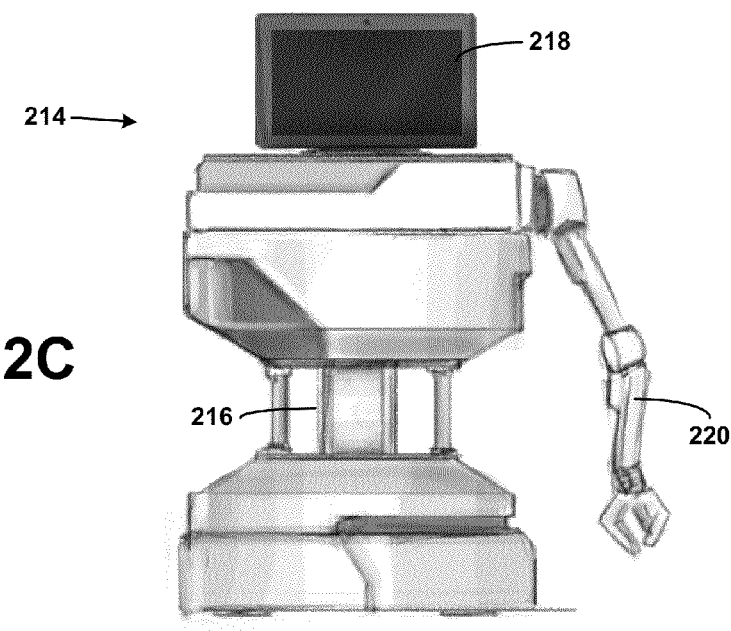
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples may also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
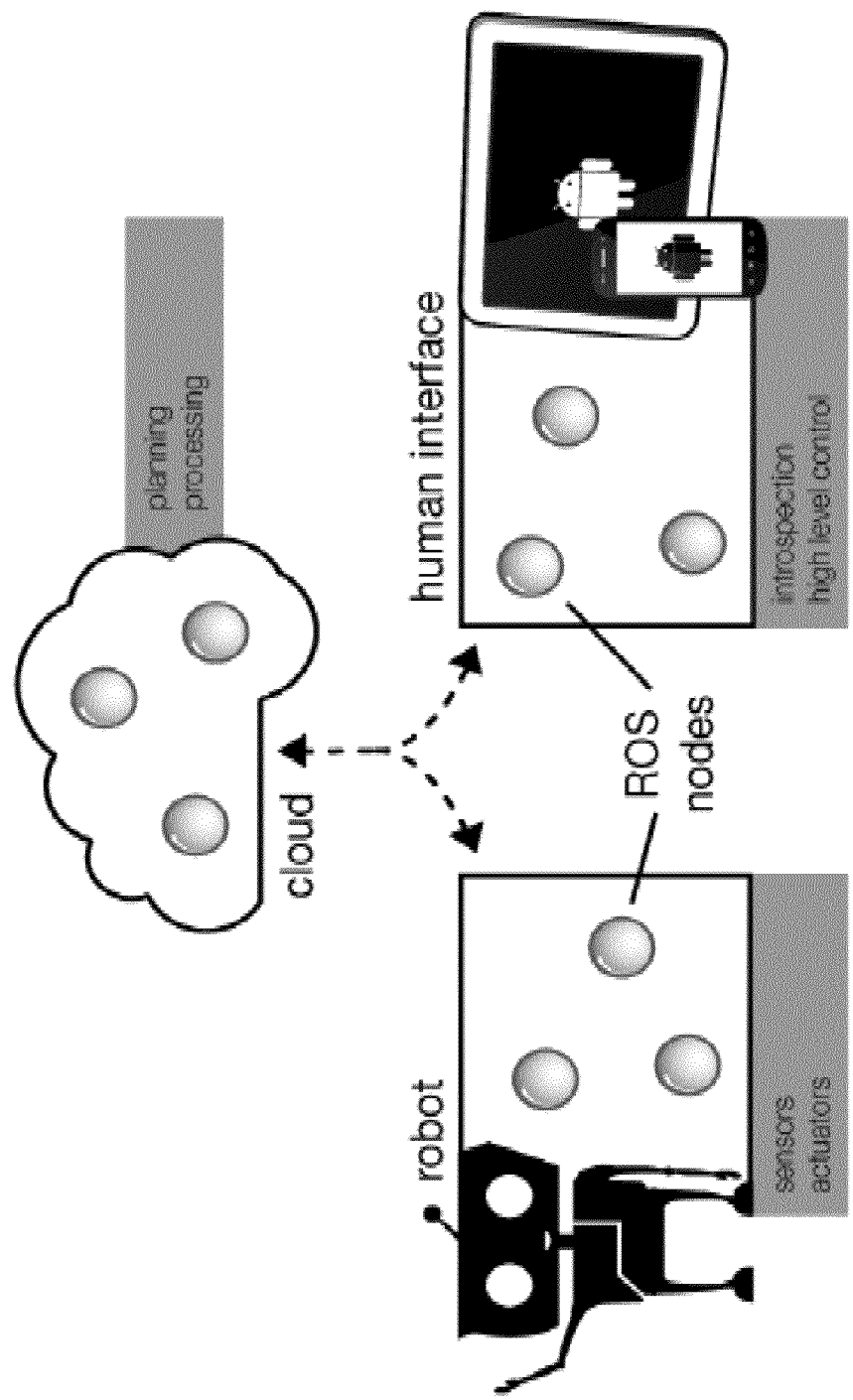
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
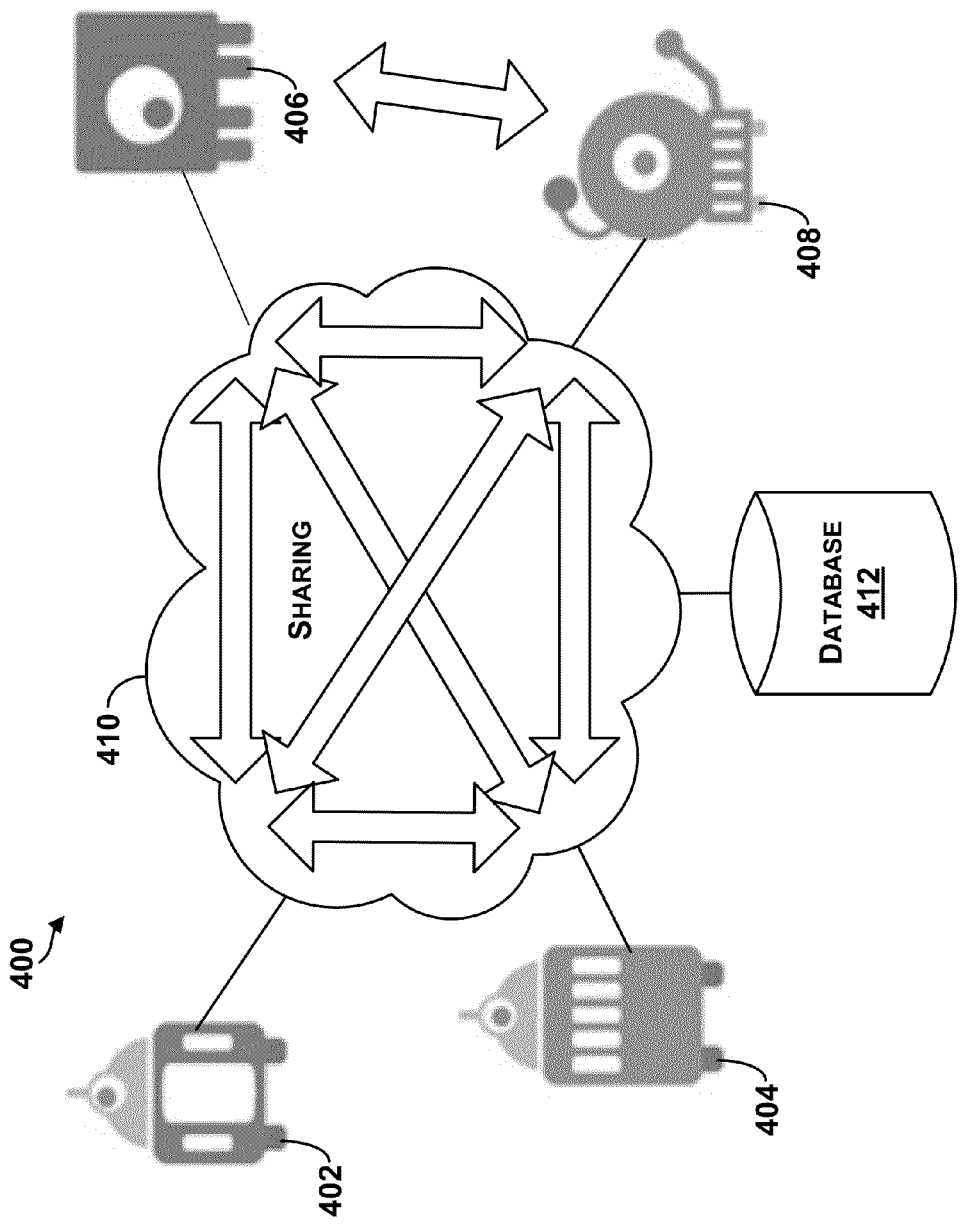
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data about the recognized object to all the robots connected to the cloud 410, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions within an area, with people, with other robots, etc. In one example, each robot 402, 404, 406 and 408 has WiFi or another network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. Robot and Cloud Functions

As mentioned, robots (or any client computing device) may interact with the cloud to perform any number of functions. Example functions are described below.

a. Object Recognition

Figure 5:
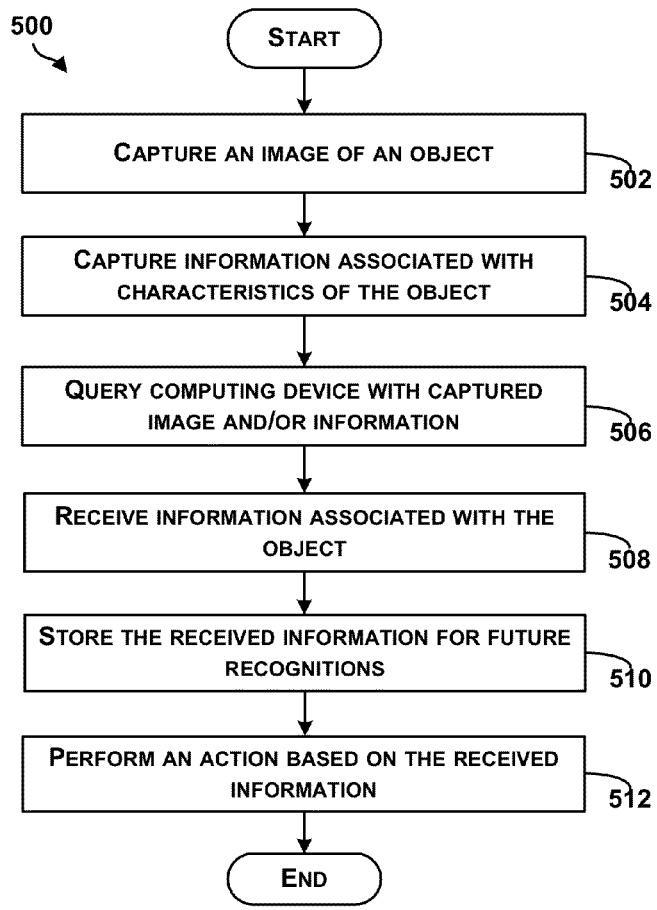
FIG. 5 is a block diagram of an example method of a robot interaction with the cloud to facilitate object recognition.

FIG. 5 is a block diagram of an example method of a robot interaction with the cloud to facilitate object recognition, in accordance with at least some embodiments described herein. Method 500 shown in FIG. 5 presents an embodiment of a method that, for example, could be used with the systems 100 and 400, for example, and may be performed by a device, such as another device illustrated in FIGS. 1-4, or components of the device. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capturing an image of an object. In an example, a robot may capture many images of objects using any number of sensors, such as a camera (still pictures or video feeds), infrared sensors, etc.

At block 504, the method 500 includes capturing information associated with characteristics about the object. For example, a robot may optionally determine or record a weight, dimensions, a texture, color, or any type of physical attribute of the object.

As another example, in an instance in which the robot may communicate with the object, the robot may capture additional data of the object, such as by accessing memory of the object. For instance, if the object has communication capabilities (such as WiFi, Bluetooth, infrared or other wireless or wired methods), the robot may communicate with the object to determine any type of data. Additionally, the object may have serial/parallel ports through which the robot may communicate with the object.

At block 506, the method 500 includes querying a computing device with the captured image and/or information. As an example, the robot may query the cloud with a captured image by sending the captured image to the cloud and requesting information about the image, such as an identity of the image or information associated with characteristics of objects in the image. Alternatively, the robot may query another robot directly to request information about the object, such as an image of an alternate view of the object.

At block 508, the method 500 includes receiving information associated with the object. For example, the robot may receive data from the cloud indicating an identity of an object in the image, or other information related to or associated with characteristics about the object. In some examples, the cloud may perform object recognition on the uploaded image or video. For example, if a picture was taken in a living room, the cloud may be able to identify a television. The cloud may even be able to recognize an exact model of television, and provide information regarding instructions for use of the television.

At block 512, the method 500 includes storing the received information for future recognitions. For example, after receiving the information from the cloud, the robot would be able to recognize the object in the future enabling the robot to learn and adapt.

At block 512, the method 500 includes performing an action based on the received information. The action may vary based on a type of received information, or the query that is presented by the robot. As an example, a robot may capture an image of a coffee maker and provide the image to the cloud. In response, the robot may receive details about the coffee maker including an identity, model number, and instructions for use. The robot may then perform actions according to the instructions for use to use the coffee maker. As another example, a robot may open a refrigerator, take inventory of objects inside (e.g., capture images, identify objects), determine/receive recipes for possible meals based on the determined inventory, and suggest a meal based on items in the refrigerator.

As an example, the robot may query the cloud to identify an object and details of the object to enable the robot to interact with the object. If the received information is not fully accurate (e.g., the robot determines a different weight of the object), the robot can share this information with the cloud to update/modify a shared database in the cloud.

As an additional or alternative method for performing object recognition, objects may be tagged with a type of identifier (e.g., radio frequency identification (RFID) chip, near field communication chip (NFC), barcode, etc.), so that a robot may include an application enabling the robot to identify the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR codes, etc. to enable a robot to localize and identify objects. Beacons may be stationary beacons or moving beacons (e.g., RFID in an employee's ID badge) to perform tracking of objects.

Figure 6:
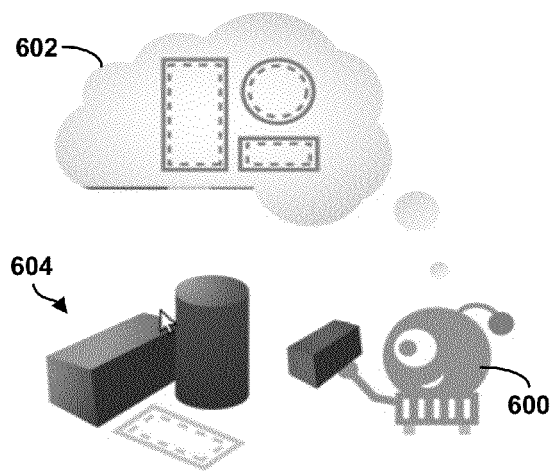
FIG. 6 is an example conceptual illustration of a robot interacting with a cloud to perform object recognition and interaction.

FIG. 6 is an example conceptual illustration of a robot 600 interacting with a cloud 602 to perform object recognition and interaction, or other functions as described in FIG. 5. The robot 600 may interact with an object (such as any of objects 604), and interact with the cloud 602 as described above to further interact with the object.

In some examples, the method 500 to facilitate object recognition may be a higher-level service (e.g., higher in a software stack), such that details and specifics for how to recognize an object may be performed by the cloud. The robot may be configured to perform actions/functions based on a result of object recognition, rather than or in addition to, performing functions regarding recognizing an object. As an example, using the method 500, the robot may execute software to perform function calls, such as GetObject( ), which may return information associated with an object (e.g., a cereal box), or PickUpObject( ), which may cause the robot to pick up the object. Enabling function calls and operation of robots through the cloud facilitates control and operation of the robot without having to control or operate various sensors/mechanical aspects of the robot, for example.

b. Mapping Functions

Figure 7:
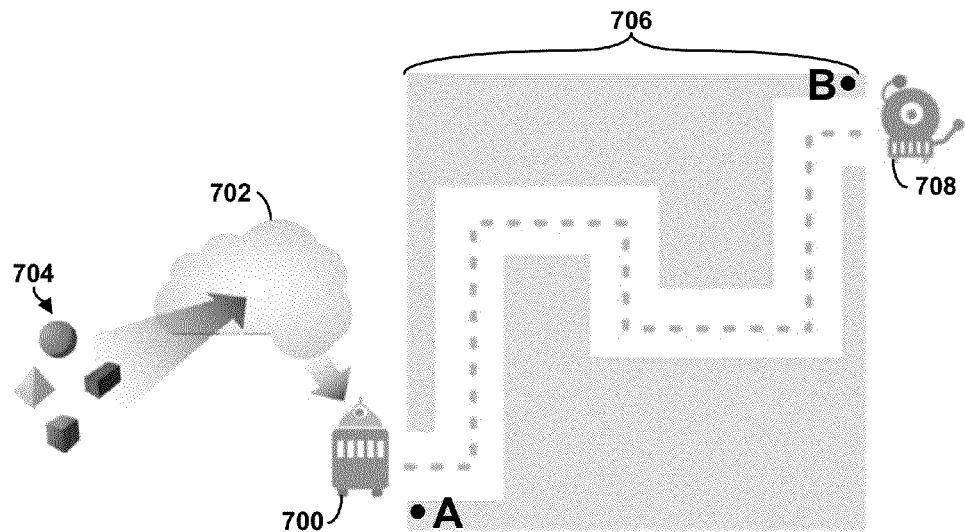
FIG. 7 is an example conceptual illustration of a mapping function.

FIG. 7 is an example conceptual illustration of a mapping function. A robot 700 may interact with a cloud 702 to perform functions as described in FIG. 5, for example, such as to perform object recognition queries of objects 704. The robot 700 may traverse through an area 706 in any number of pathways so as to map the area. As an example, the robot 700 may be configured to roam around an area in which the robot 700 is located to create a map of the area 706 (e.g., room of a house) with the aid of cloud processing. As the robot 700 navigates through the area 706 using any number of sensors to determine nearness to objects or capture images of objects, the robot 700 may relay data collected from various sensors to the cloud 702. The robot 700 may use sensors to return still pictures, video, location information, and distance information to the cloud computing system.

To perform mapping functions, the robot 700 may traverse through the area 706 capturing images using a range camera, video camera, etc., and send the data to the cloud 702. The robot 700 (or servers in the cloud 702) may identify objects within the data and provide annotations (such as mass, shape, material, etc.) of the objects. A computerized map may be generated to represent the area 706, and computer graphics (e.g., low resolution graphics) can be used to represent identified objects.

As another robot and cloud function, computer graphics within the generated map of the area 706 may be replaced with high resolution images of the objects. For example, the robot 700 may capture an image of a couch, and the cloud 702 may identify a specific model of the couch, and perform a search within a database to locate/identify a retailer that manufactures/sells the couch. A server in the cloud 702 may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Figure 8:
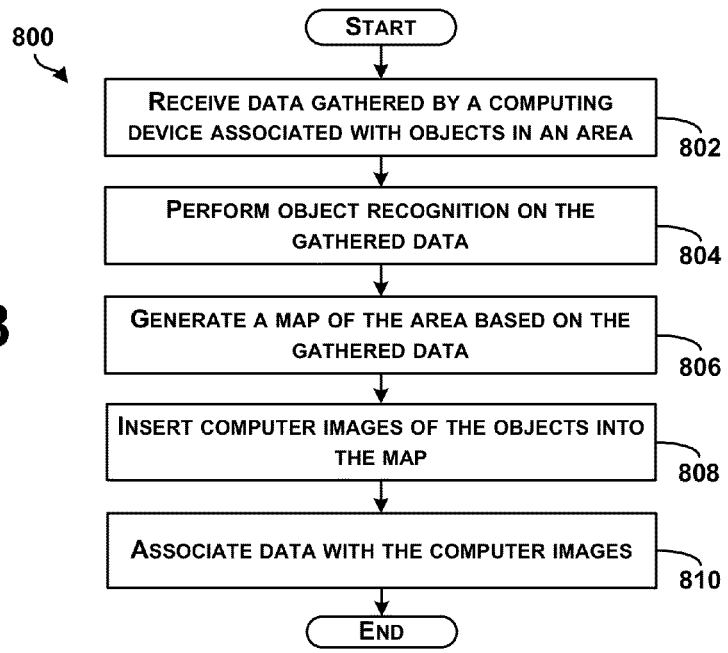
FIG. 8 is a block diagram of an example method for mapping of objects in an area or mapping an area.

FIG. 8 is a block diagram of an example method for mapping of objects in an area or mapping an area, in accordance with at least some embodiments described herein. Method 800 shown in FIG. 8 presents an embodiment of a method that, for example, could be used with the systems 100 and 400, for example, and may be performed by a device, such as the devices illustrated in FIGS. 1-4, or components of the device. The various blocks of method 800 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive, or any other type of non-transitory media described elsewhere herein.

At block 802, the method 800 includes receiving data gathered by a computing device associated with objects in an area. For example, a robot may traverse an area and capture raw data (e.g., such as point map data) and images (e.g., still or video feed) using a range camera, video camera, still camera, etc. The robot may provide the gathered data to the cloud, which may receive the gathered data. Additionally, the cloud may receive gathered metadata associated with the objects in the area, such as a time the data was collected, a location (e.g., GPS location) at which the data was collected, or other characteristics regarding when/how the data was collected.

At block 804, the method 800 includes performing object recognition on the gathered data. A server on the cloud may interpret objects, and further, shapes can be matched with a three-dimensional warehouse or database of objects to identify representations of the point maps. The server may use any type of object recognition methods, such as by matching edges, colors, variances, etc., of the gathered data to known objects within a database. The objects within the database may have associated metadata indicating characteristics of the objects.

Thus, the server can perform object extraction to identify and extract objects from the received data. The server can further localize the objects precisely in a map and provide annotations for the objects. Example annotations include mass, shape, material, etc. of the object. Annotated objects may be stored and shared through a global object database, such as, the database 412 in FIG. 4.

At block 806, the method 800 includes generating a map of the area based on the gathered data. For example, the server may use locations of the data collected as well as times the data was collected to interpret a path traversed by the robot and to create a conceptual map. The map may be further generated based on circumstantial data of the recognized objects, such as size and shape of the object. If an object has a known size and shape, and the location of the object is known, an estimated area at which the object is present can be determined.

At block 808, the method 800 includes inserting computer images of the objects into the map. For example, the server may retrieve a computer image of the recognized object (e.g., television), and insert the object into the location on the generated map at which the object is present.

At block 810, the method 800 includes associating data with the computer images. For example, the server may associate any number of metadata with the computer image, or may alternatively, retrieve metadata or other high resolution images representing the object from a retailer's database for insertion into the computer generated map. As described above, an image of a couch may be captured, and the server may identify a specific model of the couch, and perform a search within a database to locate/identify a retailer that manufactures/sells the couch. A server in the cloud may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Thus, in some examples, a robot builds shapes and appearances of all objects in a scene and performs object recognition as possible (with the help of the cloud) to provide an annotated map of objects. Raw data is gathered (e.g., point map) and used with camera data (e.g., indicating color/texture of objects) to interpret objects, and further, shapes can be matched with a 3D warehouse of objects to identify representations of the point clouds.

Figure 9A:
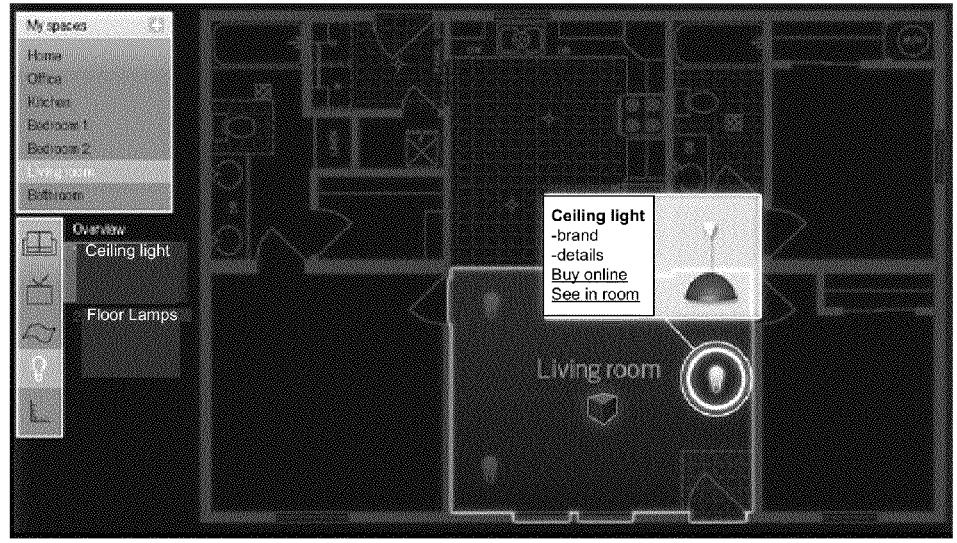
FIGS. 9A-9B are example interfaces illustrating a map of an area, and objects in the map.
Figure 9B:
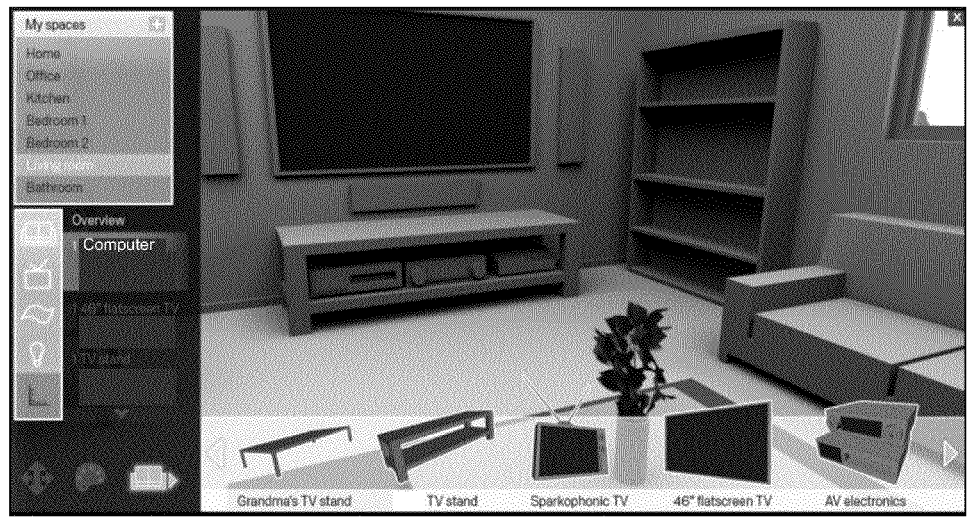

FIGS. 9A-9B are example interfaces illustrating a map of an area, and objects in the map. For example, in FIG. 9A, a home has been outlined (e.g., in a blueprint format) to show different rooms in the home. Items in the home may also have been mapped. FIG. 9B illustrates an example interface illustrating mapping of objects in a room. In some examples, the interfaces in FIGS. 9A-9B, and methods described herein, may enable a user to determine configurations of rooms, and objects in the rooms. As one example, a user may be in a store and identify a few television stands that the user would like to purchase; however, the user would like to see how the television stands look/fit into the room configuration. The user may capture some images of the television stands using a device, cause the device to perform object recognition (e.g., using the method 500 in FIG. 5), access the interface in FIG. 9A to select a room in which to place the television stand, and access the interface in FIG. 9B to insert the new television stand in place of an old television stand (e.g., swap out the old television stand with the new television stand and place the television and peripherals into a desired configuration). The example interfaces in FIGS. 9A-9B may be used to maneuver computer generated objects in a room, for example.

In further examples, the interfaces in FIGS. 9A-9B may provide information (e.g., metadata) regarding rooms or objects in the rooms as determined during a mapping of the room. For example, the interface in FIG. 9A may indicate details regarding a ceiling light, such as a brand name, a model number, details regarding light bulbs used by the ceiling light, etc., and the metadata may provide links to purchase the ceiling light or accessories online, or a link to see the ceiling light in the room, such as a link to the example interface in FIG. 9B.

c. Navigation Functions

Referring back to FIG. 7, in one example, the robot 700 may receive instructions to navigate from point A to point B across the area 706. The robot 708 may have completed this navigation previously, and may have uploaded information regarding a possible navigation pathway to the cloud. The robot 708 may have documented objects along the pathway, and also, possible obstructions as well. The robot 700 may query the cloud requesting navigation instructions to traverse from point A to point B (e.g., a map), and may receive in response, the navigation pathway shown in FIG. 7 as previously traveled by the robot 708. In this manner, the robots may share information to enable learning of the area 706.

In addition, the robot 700 may have limited memory, and in one example, to enable and manage updates, a server may include or store data to be provided to the robot 700. For instance, the robot 700 may not download "the entire world" of data, but rather, may download data representing immediate surroundings into a local cache to perform actions, such as to traverse through a portion of the area 706. The robot 700 may download additional data when needed. Furthermore, downloads can occur from the server to the robot 700, or through peer-to-peer sharing (e.g., from the robot 708 to the robot 700). Still further, basic instructions for mobility, safety, and general robot operation can be stored on-board the robot 700, while instructions for higher-level functionality may be stored in the cloud 702 and accessed by the robot 700 as needed. In some examples, the robot 700 can use "Just in Time" downloading where high level data can be downloaded first, followed by lower level data streamed as needed. In some examples, providing business logic stored in the cloud 702 enables fleet-wide upgrades to all robots.

In addition, "slug" trails may be used for shared information (i.e., information that may be used for object recognition). A slug trail may be indicative of previous requests and matching responses. Thus, in a multi-node system, the request/response can be cached so that future requests hit an answer sooner in path. For example, if the robot 700 is navigating through the area 706 and notices a hallway is blocked, the robot 700 can publish an update on the pathway so that other robots learn of the obstacle and other problems/constraints, and may request/receive an alternate pathway. Any interaction that the robot 700 experiences can be published to the cloud so that the robot 700 logs interactions to be shared amongst all robots. Specific locations may trigger robots to download new information. For example, when entering a new room, data about the room may be retrieved that was collected by another robot.

d. Inventory/Differential Functions

Figure 10:
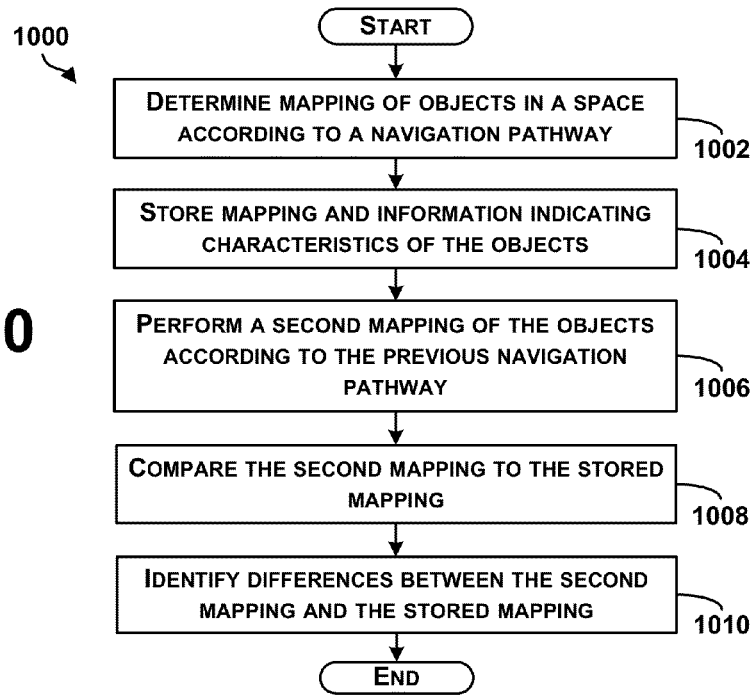
FIG. 10 is a block diagram of an example method for mapping of objects in an area and performing inventory of objects.

FIG. 10 is a block diagram of an example method for mapping of objects in an area and performing inventory of objects, in accordance with at least some embodiments described herein. Method 1000 shown in FIG. 10 presents an embodiment of a method that, for example, could be used with the systems 100 and 400, for example, and may be performed by a device, such as the devices illustrated in FIGS. 1-4, or components of the device. The various blocks of method 1000 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive, or any other type of non-transitory media described elsewhere herein.

At block 1002, the method 1000 includes determining a mapping of objects in a space according to a navigation pathway. For example, a robot may move through an area and perform object recognition and generate a map, as described above using method 500 in FIG. 5 and method 800 in FIG. 8. The robot may be configured to follow a predetermined navigation pathway through an area, or may follow a random navigation pathway through the area. The robot may store or associate the navigation pathway with the determined mapping of the area, so that a record is formed of the navigation pathway used to determine the mapping. In one instance, based on the navigation pathway, the mapping may be different (e.g., a robot may not map an entirety of an area or take account a full inventory of all objects in an area).

The mapping of the area may be, in one example, an inventory of objects in the area. As the robot traverses through the area capturing images and performing object recognition, the robot may determine what objects are present, and determine locations of objects in the area.

At block 1004, the method 1000 includes storing mapping and information indicating characteristics of the objects. For example, the robot may store the mapping locally on memory of the robot or within the cloud. The robot may further store associated information indicating characteristics of the objects with the mapping of the objects, such as, metadata describing details of the objects (weight, color, model number, size, shape, etc.).

At block 1006, the method 1000 includes performing a second mapping of the objects according to the previous navigation pathway. For example, at a later time, the robot may perform another mapping of the area using the same navigation pathway so as to take an inventory of the area at the later time. The robot may follow the same (or substantially the same) navigation pathway previously used so that the same (or substantially the same) mapping of the area and objects in the area can be determined.

At block 1008, the method 1000 includes comparing the second mapping to the stored mapping, and at block 1010, the method 1000 includes identifying differences between the second mapping and the stored mapping. By comparing the two mappings, differences between the mappings can be identified to determine differences in the inventoried objects.

As an example using the method 1000 of FIG. 10, a user may configure an area (e.g., bedroom) into a default configuration (e.g., where all clothes are picked up off the ground, items are arranged and the room is cleaned). The user may request the robot to perform a mapping and inventory of objects in the bedroom with the bedroom in the default configuration. Afterwards, if the user has misplaced an item, the user may request the robot to perform a new inventory of the room, and the new inventory can be compared to the default inventory to determine what changes have been made to the bedroom (e.g., what objects are not in the default location).

As another example using the method 1000 of FIG. 10, a user may configure a stock room at a retail store into a default configuration (e.g., all shelves are fully stocked). The user may request the robot to perform a mapping and inventory of objects in the stock room with the room in the default configuration. Afterwards, the user may request the robot to perform a new inventory of the stock room to determine what items have been sold. The new inventory can be compared to the default inventory to determine what changes have been made to the stock room, such as, to indicate a current supply of items in the stock room that can be used to configure future orders. The default inventory map may thus be a benchmark map of the room in a clean state, so that subsequent maps can be performed to determine a differential between the benchmark and a current condition of the room.

Thus, in some examples, a robot may create an inventory of objects in a room or scene, along with a mapping of the objects to catalog all objects in the space and to store details of the objects (e.g., name, shape, color, last known location, etc.). The robot may have a navigation path that is followed to inventory a space, so that the same navigation path can be traversed to identify missing/new objects.

e. Voice Recognition/Control

Figure 11:
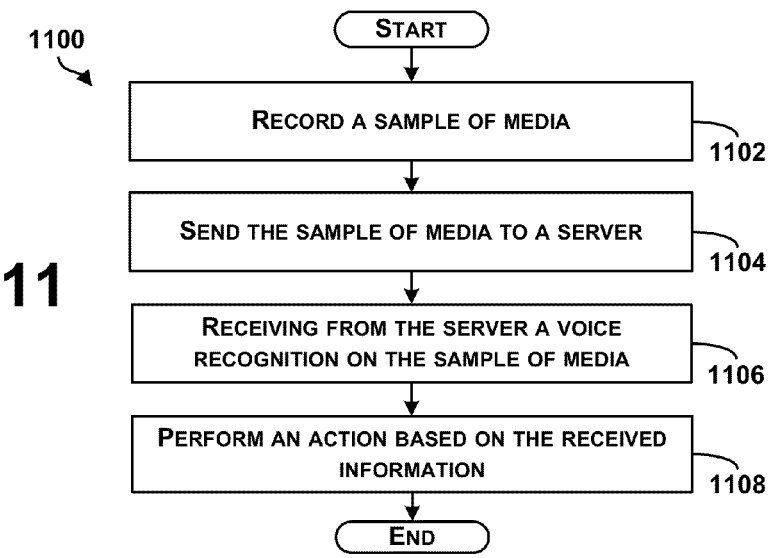
FIG. 11 is a block diagram of an example method for performing voice recognition/control by a robot, all arranged in accordance with at least some embodiments described herein.

FIG. 11 is a block diagram of an example method for performing voice recognition by and/or control of a robot, in accordance with at least some embodiments described herein. Method 1100 shown in FIG. 11 presents an embodiment of a method that, for example, could be used with the systems 100 and 400, for example, and may be performed by a device, such as the devices illustrated in FIGS. 1-4, or components of the device. The various blocks of method 1100 may be combined into fewer blocks, divided into additional blocks, and/or or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive or any other type of non-transitory storage media described elsewhere herein.

At block 1102, the method 1100 includes recording a sample of media. For example, a user may interact with a robot by speaking to the robot, and the robot may record the speech of the user. The robot may record samples of speech from other areas as well (e.g., televisions, radio, etc.) and of other types of media, such as music, video, live performances, etc.

At block 1104, the method 1100 includes sending the sample of media to a server. For example, the robot may be configured to communicate with a server (e.g., the "cloud"), and may send the sample of media using wired or wireless communication to the server.

At block 1106, the method 1100 includes receiving from the server a voice recognition of the sample of media. The server may use any number of known techniques for performing voice recognition, and may provide a response to the robot. The voice recognition response may include a textual equivalent of the speech, such as when the server performs speech to text processes.

At block 1108, the method 1100 includes performing an action based on the received information. In one example, the voice recognition response may also include a command or instructions indicating actions for the robot to perform. In this example, the server may perform a voice recognition, and may further identify actions to be performed by the robot in response to the voice recognition. As a specific example, the user may speak "call John" to the robot. The robot may record the speech and send the speech sample to the server. The server may recognize the speech, and return a voice recognition response to the robot with instructions for the robot to call a user named John at the phone number 555-1234. The robot may then initialize a phone call to John using internal phone capabilities. If the robot is not equipped with a wired or wireless telephone, the voice recognition response may further include instructions to the robot for how to initialize the phone call, such as to provide a map to the robot of where a telephone is located, provide a navigation pathway to the robot to instruct the robot how to traverse to the telephone, provide instructions how to use the telephone to the robot, and provide the phone number of John to the robot.

f. Contextual/Situational Robot Functions

A robot may perform any actions or queries to the cloud as described herein based on contextual information and/or situational information. Contextual information may include information that has been observed via one or more sensors and that relates to an object's location, environment, and/or surroundings. In some embodiments, contextual information may include (1) a map of one or more areas and objects associated with the map; (2) previously recognized objects and/or uses of the objects; and/or (3) an inventory of one or more objects in the area. The cloud may analyze the contextual information to infer, predict, or otherwise recognize an object. For example, the robot may send a query to the cloud that includes the location of the object, location of the robot, images or the identity of objects within a predetermined distance of the object, the time of day, a description of the area in which the object is located, etc. The cloud may receive the query with the contextual information. In embodiments, the query may also include identification data such as (1) a code, tag, or beacon, (2) one or more images of the object, and (3) a name, description, or other identifier associated with the object. The cloud may recognize objects by performing a lookup in a local and/or cloud-based database of all or part of the information received in the query. The cloud may send data associated with the recognized object to the robot, such as an identifier associated with the recognized object, one or more physical characteristics of the object, one or more instructions executable by the robot to interact with the recognized object, etc.

The cloud may also receive situational information from the robot. Situational information may include environmental data associated with a certain location at a certain time. Situational information may also include information, such as a command, which may convey a meaning. The cloud may analyze the situational information to interpret an object, object use, meaning of a command, etc. In some embodiments, situational information may include (1) a history of interactions associated with one or more of the objects; and/or (2) user preferences. Situational information may also or alternatively include gestures or other actions performed by a user and/or the robot, commands from the user, inferences made by the robot, intonations associated with a user's command or affirmation, etc., which may be received from the robot and sent to the cloud as part of the query, for example. The cloud may receive the situational information and analyze the situational information using a series of look-ups in a global database, for example. Moreover, the cloud may use situational information to analyze (1) how the robot has interacted with the object in the past, (2) what the interaction included, (3) what environment the interaction occurred in, etc. In embodiments, the cloud may identify and send to the robot instructions that are associated with the situational information and executable by the robot.

In an example, a robot may have contextual information relating to a local environment in which the robot operates (e.g., a local map, a location, etc.). The robot may use this contextual information as a constraint for a recognition system configured to identify objects within an image captured by the robot. For example, if the robot is in an office, the robot may access an "office" database of objects within the cloud to perform object or data recognitions. Thus, in one example, the robot may send the cloud a query to determine or identify an object. The query may include (1) an image and (2) contextual information, such as an indication of a location of the robot. The server may use the contextual information received from the robot to select a database in which to search for a matching object.

Thus, in some examples, a robot may use location, and/or possible nearby objects as constraints for a recognition system to provide a context of the environment, and the recognition system may then perform object recognition using a subset or a limited set of nouns/verbs/objects to improve recognition accuracy.

As another example, the robot may operate with situational awareness such that a robot may inventory objects in a scene, and if given a command by a user, the robot can determine the content or interpret the meaning of the command based on a situation of the scene or by comparing with objects in the scene (e.g., command is to retrieve a cola from the refrigerator, and robot can use limited database warehouse of objects associated with "house" to quickly identify refrigerator/cola, etc.). The robot may be configured to use contextual data (such as the location of the cola and/or the recognition of an object as a cola) as well as situational data (such as the meaning of the command and/or the relationship between the cola and the refrigerator) to help perform decision making.

In still another example, a robot may perform actions using situational data, such as time of day, as well as context data, such as the weather outside, etc. For example, situational data may be used to determine that it is nighttime (e.g., dark outside) and to determine that the robot may be configured to move more slowly and make less noise during the night as compared to during the day. In another example, situational data may be used to determine that it is morning (e.g., light outside) and to determine that, in the morning, a robot may offer coffee to a person as opposed to a soft drink. Other examples that may affect configurations of robot actions include if the contextual data indicates that the weather is rainy, then the server may use situational data to determine that the robot may offer an umbrella to the person. Moreover, if contextual data indicates what a person is wearing, then situational data may be used to interpret whether the person will be hot/cold due to weather. The robot may use the situational data to offer suggestions to the person about clothing choices, for example. Thus, the robot may take context and/or situation into account, as well as whom the robot is interacting with when determining an appropriate response/function. Still further, a robot may make a sound of presence, intent, and/or state, based on context/situations.

As still another example, a voice recognition database (or information from a voice recognition database) may be provided to a client device (e.g., robot) to enable the robot to perform voice/speech recognition locally. The voice recognition database may be provided based on a current state of the robot. As an example, if a robot is in an office setting, an office database for voice recognition may be provided to the robot to enable a voice recognition process to be performed more quickly than having the robot search within a database for all settings. Any situational or contextual information of the robot may be used to select a voice recognition database to provide to the robot. As other examples, a time of day, topic of a conversation, location of the robot, etc. may be used individually or in combination to select a voice recognition database to provide to the robot.

5. Object Recognition

Figure 12:
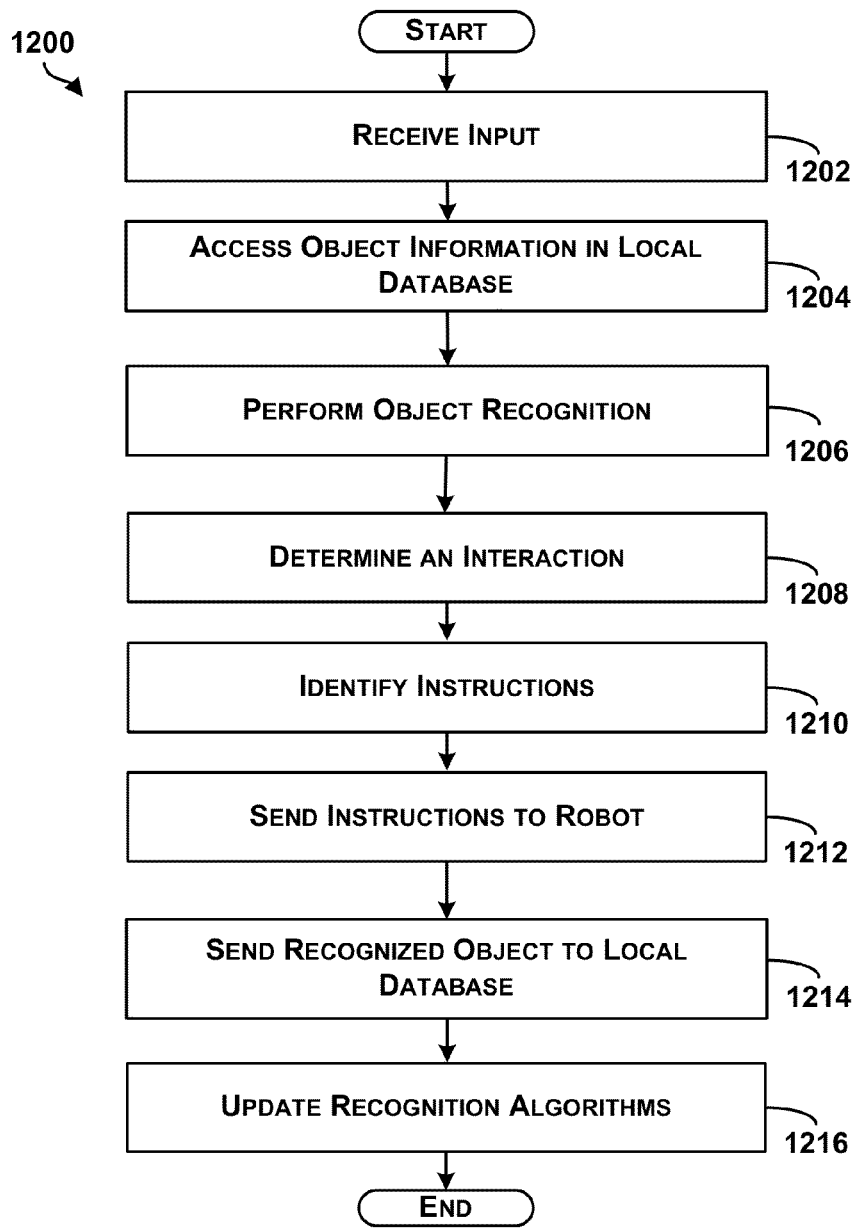
FIG. 12 is a block diagram of an example method for processing data.

FIG. 12 is a block diagram of an example method for processing data, in accordance with at least some embodiments described herein. Method 1200, shown in FIG. 12, presents an embodiment of a method that, for example, could be used with the systems 100 and 400, and may be performed by a device, such as the devices illustrated in FIGS. 1-4, or components of the device. The various blocks of method 1200 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive, or any other type of non-transitory media described elsewhere herein.

At block 1202, the method includes receiving an input associated with an object. The input may include, for example, (1) an identifier of the object, (2) an image of the object, (3) a command to take some action related to the object (e.g., pickup, fetch, prepare, deliver, etc.), or (4) a question about the object (e.g., what is it?, where is it?, whose is it?, etc.).

In some embodiments, the identifier of the object may be a signal, 1D barcode, 2D barcode, RFID, NFC chip, bluetooth transceiver, etc., attached to or otherwise associated with the object. For example, the object may be a hammer. A RFID may be attached to the hammer and may be used to identify the hammer. A robot or other computing device may be able to scan the RFID and send the RFID or information encoded in the RFID to a server. The server may be located in or otherwise associated with a cloud, such as the cloud configurations described elsewhere herein.

In some embodiments, the robot or other computing device may obtain an image of the object. The image may be obtained by scanning the object, taking one or more pictures of the object, etc. For example, the robot may use a camera or other sensor to take a picture, a photograph, a thermogram, etc. of the object. The robot may send the image of the object to the server and/or may store the image of the object locally (e.g., in a local database).

In further embodiments, the input may be a command. The command may be given by a user to the robot and be subsequently sent from the robot to the server, for example. The command may be a verbal, electronic, or any other form of command. An example verbal command may include an instruction for the robot to retrieve an object (e.g., a Phillips-head screwdriver) from an area (e.g., the garage). Another example verbal command may include a query about an object, e.g., where are car keys, whose shoes are on floor, etc. An example electronic command may include an electronic input that is entered into the robot via an interface on the robot or an electronic input that is sent to the robot from a computing device, e.g., a computer, mobile phone, or smartphone, for example. The robot may send the command to the server as an input.

At block 1204, the method includes accessing object information in a local database. The local database may be located at the robot that sent the input to the server, at a different robot, on the server that received the input from the robot, on a different server, etc. In embodiments, the local database may be a single database or a plurality of databases, which may or may not be synced together.

The local database may include information relating to one or more objects. In an example, the local database may include a list of all (or substantially all) objects that are located in a specific area, such as in the user's house or in the user's garage. Thus, for example, the local database may include a collection of objects that are located in a specific garage (e.g., the user's garage) or an aggregation of objects that are in a plurality of garages owned by the same user or a plurality of different users. Information in the local database may be accessed by the server, the robot, the user, etc.

At block 1206, the method includes performing object recognition. The process of performing object recognition may include obtaining information from the local database and/or information from a global database. The local database may be stored on a robot, on multiple robots, on a server, distributed over a plurality of servers, etc. The local database may include contextual data that may be used to recognize an object, for example. The global database may be stored on a robot, on multiple robots, on a server, distributed over a plurality of servers, etc. The global database may include situational data that the server may use to maintain a historical record or log of objects, object locations, interactions between a robot and the object, timestamps associated with the interaction, etc. The server may also store on the global database commands, actions, etc., that may be associated with objects, instructions, etc. In embodiments, the server may use situation data from the global database to determine a meaning of a command by looking up data associated with the command and/or action, for example.

Generally, the local database may include information that may aid the server in performing the object recognition. In embodiments, this information may include one or more of: (1) a map of one or more areas and objects associated with the map; (2) previously recognized objects and/or uses of the objects; and (3) an inventory of one or more objects in the area. The server may use the information in the local database to perform a contextual analysis. In particular, the server may use a contextual analysis to recognize the actual object by looking up data obtained about the object in a local database, for example.

The global database may include information that may aid the server in interpreting and/or comprehending a command, for example. This information may include: (1) a history of interactions associated with one or more of the objects; and/or (2) user preferences. In embodiments, the server may use the information in the global database to perform a situational analysis. For example, the server may use situational analysis to recognize or interpret the meaning of a command and/or determine the use of the object by identifying and looking up a word, gesture, object shape, etc., in the global database, for example.

The local database may include a map of an area and objects that are or should be associated with the map. An example area may be defined by a coordinate or other location based system and include a room, office, city, state, country, etc. The map may be visually represented by a diagram. The map may aid the server in performing object recognition by indicating what objects are located in the area. The server may use this information to narrow down the possible identification of the object, for example. The identified possible object may be the candidate object.

In some embodiments, multiple maps may cover the same area. For example, a first map may be of a workbench within a garage and another map may be of the garage. Similarly, yet another map may be of a house that includes the garage and the workbench. Rather than storing duplicative maps, the server may store a unique primary map (e.g., of the world) that may be divided into unique smaller maps, such as of a room or of a city. The smaller maps may be predefined, such as by the boundaries of a room, or may be created ad hoc. Ad hoc maps may include an area having a proximity to the current location of the object, the past location of the object, the robot, the user, etc.

Maps may be public or private. Public maps may be accessed by any robot, user, etc. Private maps, however, may be accessed by limited robots, users, etc. Access may be limited by various authentication and/or authorization mechanisms. For example, the robot may be in a room having confidential material. The map may include private permissions that may restrict the robot from accessing the map of the room or portions of the room without first being authenticated (e.g., via a digital signature) and authorized access to the map of the room.

In addition to including a map of an area and objects associated therewith, the global database may also include previously recognized objects and/or uses of the objects. Previously recognized objects may include objects that have been previously recognized to a predetermined level of certainty. Optionally, previously recognized objects may include objects that have been verified based on feedback from the robot and/or user, for example. In embodiments, the feedback may be used to confirm or correct data associated with the recognized object, update data associated with the recognized object, and/or adjust query data that may be sent from the robot to the server.

In an example, the robot may obtain an identifier, such as a barcode, that may be associated with the object. The robot may use the identifier to recognize the object to a predetermined level of certainty and send information about the recognition of the object to the server, which may store the recognition of the object in the local and/or global database, for example. In another example, the robot may identify uses of the object based on one or more prior interactions that the robot has had with the object. Thus, if the robot previously interacted with a door handle by turning the door handle and opening the door, then the robot may store use data indicating that the door handle may be used to open the door.

The local database may include an inventory of objects in an area. The inventory of objects may be determined based at least in part on the objects associated with the map of the area. For example, the server may determine which objects are located within the area and create an inventory of all objects within the area. The inventory process may be periodic or event driven. Periodic inventorying may occur on an hourly, daily, weekly, monthly, quarterly, yearly, etc., basis. Event driven inventorying may occur when a user requests an inventory, when a searcher instructs the robot to search for an object, etc. The inventory of objects may be stored in the local database or distributed across multiple local databases, for example. The server may use the inventory to limit the server's search to objects in the inventory. If the object is not identified as one of the objects in the inventory, then the server may search a broader set of objects such as all objects in the local database. If the object is identified as one of the objects in the inventory, then the server may identify the object as a candidate object. The candidate object may or may not be the actual object located within the area. Rather, the candidate object represents an object that has a certain probability of being the actual object located within the area. The probability may depend on a variety of factors discussed elsewhere herein.

The global database may create or maintain a history of interactions. The history of interactions may be between the robot and the object. The interactions between the robot and the object may be intentional or unintentional. For example, the user may command the robot to obtain the hammer. In response, the robot may perform the intentional interaction of obtaining the hammer. In another example, the robot may be moving throughout the garage and unintentionally run into a workbench. The intentional interaction of obtaining the hammer and/or the unintentional interaction of running into the workbench may be stored as history in the global database.

The server may use the history of interactions in performing object recognition. For example, when the robot has an interaction with the object, the server may recognize that the type of interaction that the robot has had primarily occurs with a specific object or type of object. Thus, the server may use the history of interactions to determine or otherwise interpret what object the robot has likely interacted with. As an example, the server may determine that the robot frequently runs into a workbench, but does not frequently run into a toolbox. From this, the server may determine that the object that the robot ran into has a higher probability of being a workbench than a toolbox, for example.

The global database may also include user preferences. User preferences may broadly include how the user wants the robot to interact with the object, how the user wants the object identified in the local or global databases, how often the user wants the robot to access the server for object recognition, how much and what kind of information the user wants the robot to send to the server, etc. In an example, the robot may scan an image of a safe located in the garage. The user, however, may not want the location and/or the existence of the safe to be sent to the server. Therefore, the user may enter a user preference indicating that the existence and/or the location of the safe only be stored locally on the robot or not at all.

The server may use the user preferences when performing object recognition. For example, the user may specify that all of the tools in the garage are brand "abc" tools. The server may use this information to narrow the possible objects to brand "abc" tools. In embodiments, the object recognition may be additionally narrowed by the image of the object, the object identifier, a command, etc.

The server may use contextual analysis to recognize the object. Contextual analysis may be used to recognize the object based on sensor information received from the robot that relates to the object's location, environment, surroundings, other objects in the vicinity of the object, etc. For example, the robot may obtain an image of an object that is cylindrical and about eight inches tall. The robot may send this information to the server, which may determine that a number of objects may be similar to the image. For example, a large energy drink can, spray paint, hairspray, etc., may all be similar to the image.

The server may use a map of an area to obtain a context associated with the object. For example, the server may identify the object as located in the user's garage and, therefore, access a map of the user's garage. The server may also access the local global database to determine what objects are typically located in the user's garage and/or in garages generally throughout the region. From this data, the server may identify which objects are typically located in the garage and which of the identified objects may be cylindrical and approximately eight inches tall. The identified objects may be candidate objects, which have a certain probability of being the actual object located within the area. Using the location (e.g., the garage) for context, the robot and/or server may identify the object as having a relatively higher probability of being a can of spray paint as opposed to a can of hairspray, for example.

The server may use situational analysis to recognize one or more uses of the object in certain situations, for example. Situational analysis may be used to interpret or convey a meaning of a command, the use of an object, etc. In embodiments, situational analysis may include evaluating (1) how the robot has interacted with the object in the past, (2) what the interaction included, (3) what environment the interaction occurred in, etc. Situational analysis may also be used to interpret an input, such as a command. For example, the server may receive a command from the robot instructing the robot to "bring me a screwdriver." The server may use situational analysis to determine from prior situations that the phrase "bring me" means to locate the object, obtain the object, and move the object from the object's current location to a location associated with the source of the command, wherein the source of the command may be obtained using any number of location sensors. The server may also use situational analysis to determine that the object in the command (i.e. "screwdriver") is a tool in the garage rather than a cocktail, for example, based on whether the user giving the command is working on a car in a garage versus dining at a restaurant. Contextual analysis may be used to determine what objects in the local database may be associated with the "screwdriver." For example, other objects associated with a "screwdriver" tool may be screws, a toolbox, other tools, etc., whereas other objects associated with a "screwdriver" cocktail may be a refrigerator, orange juice, ice, drinking glass, etc.

In another example, situational analysis may be used to receive an input in the form of an object identifier. The object identifier may indicate that the object is a box for holding objects such as fishing tackle, tools, etc. Contextual analysis may be used to determine that the box is located in the garage next to an electric drill and a chainsaw. From this context, the server may determine that the box is more likely to be a toolbox than a fishing tackle box. Situational analysis may be used to determine what interaction the robot has had with the toolbox in the past and what interaction the robot is likely to have with the toolbox in the future. For example, the server may determine that 90% of the interactions that the robot has had with the toolbox (or other toolboxes in general) include opening the tool box to retrieve a tool and 10% of the interactions have included the robot moving the toolbox to another location, such as the trunk of the user's car. This situational data may be used to determine that the robot's likely interaction with the toolbox will be to open the toolbox and retrieve a tool from the toolbox, for example.

In further embodiments, a number of machine learning algorithms may be employed to estimate the probability that a recognized object has been correctly identified by the system (e.g., correctly recognizing that the box is a toolbox rather than a tackle box as in the previous example). The estimated probability may include weighting and combining one or more individual events. For example, the server may use a machine learning algorithm, or any probability algorithm in general, to estimate the probability that the object is a toolbox. The estimation may be based at least in part on images of the object and/or an identifier associated with the object, for example. In embodiments, the server may also estimate the probability that the object is a toolbox based on an inventory of objects in the area, a historical record or log of the objects that were located at or near the current location of the object, etc. One or more of these probabilities may be weighted and combined to determine the probability that the recognized object in this example is a toolbox rather than another type of box. In some embodiments, this probability or any of the individual probabilities may be compared to a threshold. A probability that meets or surpasses the threshold may indicate a high likelihood that system has correctly identified the recognized object.

In yet further embodiments, a machine learning algorithm may also or optionally be used to estimate a confidence interval associated with the probability that the recognized object has been correctly identified. The confidence interval may be specific to each individual probability, one or more combined probabilities, etc. The confidence interval may be compared to a threshold value, which may indicate a degree of confidence in the identification of the object, e.g., a 90% certainty that the recognized object is a toolbox.

Additional algorithms, such as dynamic programming algorithms, greedy algorithms, linear programming algorithms, decrease and conquer algorithms, etc., may be used to determine probabilities and/or recognize the object. Moreover, any number of the algorithms may be used to calculate and/or adjust probabilities and/or confidence intervals associated with the recognized objects. Data mining and/or other pattern recognition techniques may be used to facilitate the object recognition process. For example, data mining may be used to determine trends in the historical record or log, how or where objects are located within an area, etc.

At block 1208, the method may include determining an interaction. The interaction may be determined based at least in part on the recognition performed by the server. The interaction may optionally or additionally be determined based on an input or query response from the user and/or robot. The query response may indicate a user preference or a desired interaction between the robot and the object, for example.

In an example, the server may determine an interaction that the robot is likely to have with the object. This determination may be performed by analyzing historical records or logs of prior interactions that the robot has had with the object and determining the probability that the robot will have the same or similar interaction. In this way, the server may determine what interaction has the highest probability of occurring.

In another example, the server may determine an interaction based on the received inputs. For example, the server may receive the command "bring me a screwdriver." The server may parse the command and identify words and/or phrases within the parsed command. The server may lookup one or more of the parsed words and/or phrases in the local and/or global database and determine the meaning of the parsed words and/or phrases, for example. Thus, the server may receive the command "bring me a screwdriver," parse the word "bring" from the command, and lookup the word "bring" in the global database. Information in the global database may indicate that the word "bring" includes the separate interactions of locating the object, obtaining the object, and moving the object from the object's current location to the location of the user, for example.

At block 1210, the method may include identifying instructions. The process of identifying instructions may include the server searching the global database, local database, or any other database for instructions associated with the one or more interactions. In embodiments, one or more instructions may correspond to a single interaction. The instructions may be generic and, therefore, executable by a plurality of different robots. Optionally, the instructions may be specific to and executable by a specific robot or model of robot, for example.

In embodiments, the server may identify one or more computer executable instructions to perform an interaction. For example, the server may identify computer executable instructions that may be executable to obtain the screwdriver. These instructions may include details on what angle the robot should use to grab the screwdriver, how wide the robot should open and close a robotic hand to grasp the screwdriver, how much force to use to grasp the screwdriver, etc. The server may also identify instructions that may be executable to cause the robot to move from the location with the screwdriver to the location of the user. These instructions may include a path for the robot to follow to avoid barriers, instructions on how to move around barriers if the robot encounters a barrier, etc. Instructions may also be identified that instruct the robot to let go of the screwdriver or otherwise provide the user with the screwdriver without harming the user (e.g., by dropping the screwdriver on the user), damaging the screwdriver, damaging an object near the user with the screwdriver, etc.

At block 1212, the method may include sending the instructions to the robot. In embodiments, one or more of the identified instructions may be sent to the robot. The instructions may be sent all at once or as needed by the robot to complete an interaction, for example.

At block 1214, the method may include sending the recognized object to the local database. In embodiments, information associated with the recognized object may be sent to one or more local databases, where the information may be stored. For example, information about the recognized object may be sent to the local database that was accessed by the method at block 1204. In another example, information about the recognized object may be sent to all local databases accessible by the server. In yet another example, the server may determine which database(s) to send the information based on the contextual and situational analysis performed by the server. Thus, for example, the recognized object may be a screwdriver. The contextual analysis may indicate that the screwdriver was located in the garage. Accordingly, the server may send information about the screwdriver to a local database including information about objects in the user's garage as well as a local database including information about objects in a plurality of garages. Optionally, the server may send information about the screwdriver to the local database including objects in the garage, and that database may periodically send information about the objects in the garage to a second database that accumulates information about objects in a plurality of garages, for example.

In embodiments, information about the recognized object and/or interactions that the robot may have had with the recognized object may also be sent to the global database. For example, if the robot retrieved the screwdriver and brought the screwdriver to the user, then information about the recognized object (e.g., the screwdriver) as well as information about the interactions of retrieving and/or bringing the screwdriver to the user may be sent to and stored at the local and/or global database.

At block 1216, the method may include updating recognition algorithms. The recognition algorithms may include one or more algorithms that may be used to recognize the object, contextually analyze the object, and/or situationally analyze the object. In embodiments, multiple recognition algorithms may be updated to reflect changes in probabilities, confidence intervals, object shapes, object sizes, identifiers, historical trends (which may be deduced from the historical records or logs), uses of the object, interactions between the object and the robot, user and/or robot feedback, etc. In some embodiments, the updating may have no affect on the algorithms. The frequency of updating the recognition algorithms may be periodic or random (e.g., based on a quantity of updates that may need to be performed or based on a user prompt).

While a number of blocks have been described in FIG. 12, it should be understood that some embodiments may include a subset of the blocks described in FIG. 12. For example, some embodiments may include object recognition but may not include an interaction with the object. As such, some embodiments may not determine an interaction, identify instructions, or send instructions to the robot. In another example, the server may aggregate information about recognized objects and send the aggregated data to the appropriate local databases and/or global database once aggregated. In such examples, the server may not send the recognized object to the local database or update the recognition algorithms in each implementation of the method.

Figure 13:
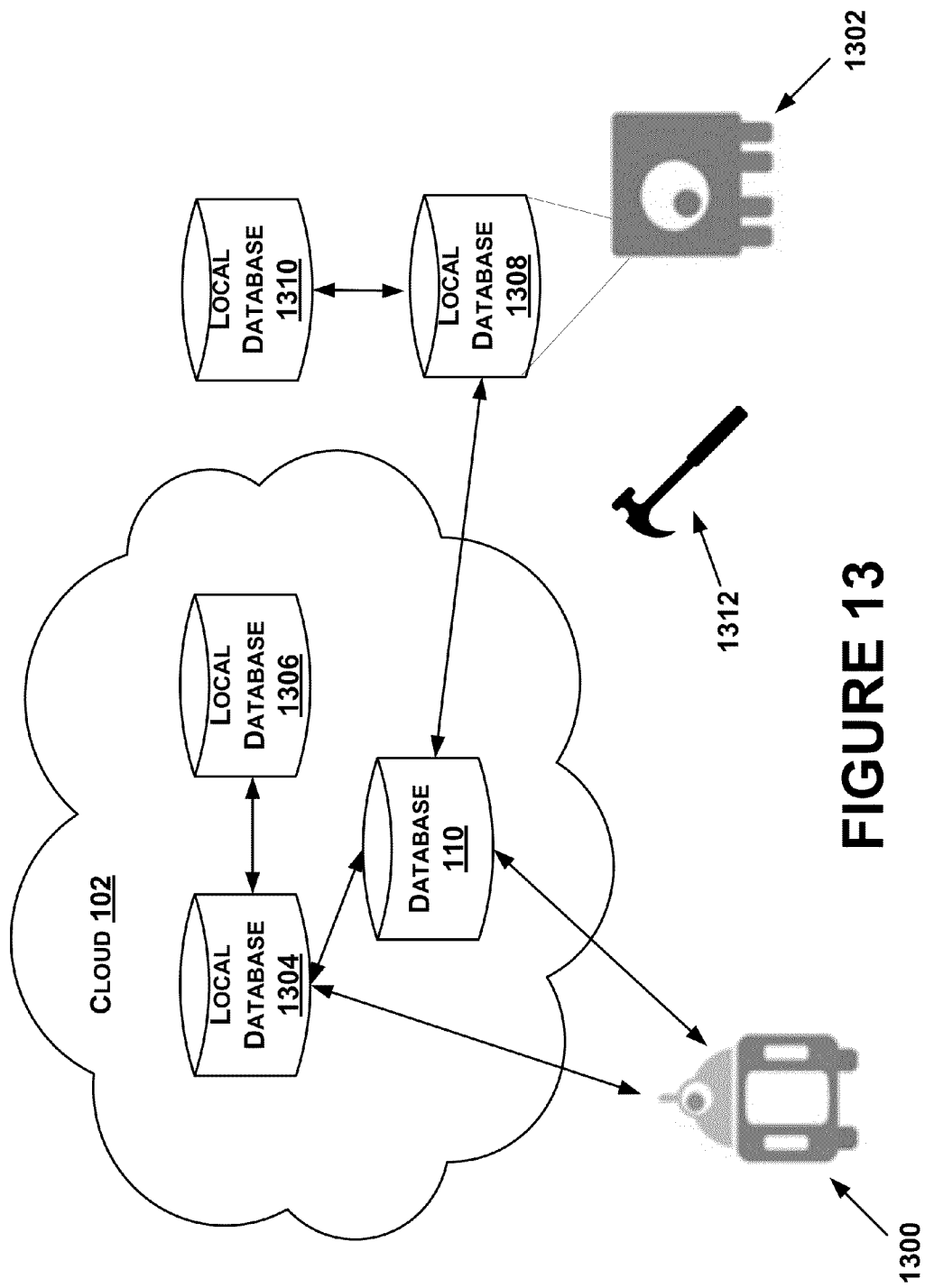
FIG. 13 is an example system having a plurality of databases.

FIG. 13 illustrates an example system having a plurality of databases, in accordance with at least some embodiments described herein. In particular, FIG. 13 illustrates a system with multiple robots 1330, 1302 interacting with a cloud 102. The cloud 102 may be a service or a group of services accessible over a network (e.g., Internet) by client and server devices. In some embodiments, the cloud 102 may be represented by a server. The cloud 102 represented in FIG. 13 may be similar to the cloud represented in FIG. 1 and include the cloud service 104, cloud platform 106, infrastructure 108, and database 110 that are described in more detail in FIG. 1.

The cloud 102 may include a global database 110. The global database 110 may include all or a subset of the information from the local databases 1304, 1306, 1308, 1310. In embodiments, the data in the global database 110 may be aggregated or otherwise organized in a manner that may allow the server to perform analytics on the data. The analytics may be used for contextual analysis and/or situational analysis, for example. In some embodiments the database 110 may include features of both the global and the local database.

In addition to a global database 110, the cloud 102 may also include local databases 1304, 1306. However, the local databases 1304, 1306, 1308, 1310 may not reside on the cloud 102. For example, some embodiments may include a local database 1308 located at the robot 1302. Moreover, in further embodiments the local database 1310 may be located external from both the cloud 102 and the robot 1302.

One or more of the local databases 1304, 1306, 1308, 1310 may communicate with each other and/or with the global database 110. In some embodiments, the communication may include the transfer of information from the local database 1304, 1306, 1308, 1310 to the global database 110 and/or to the robot 1300, 1302. In further embodiments, the transfer of information may be permanent or transient. Thus, for example, information may be sent from a first local database 1310 to the global database 110 via a second local database 1308, wherein the second local database 1308 may transiently store the transferred information in route to the global database 110.

The robots 1300, 1302 may obtain information about an object 1312 in a number of ways, such as obtaining an identifier associated with the object 1312, obtaining one or more images of the object 1312, obtaining or otherwise receiving a command that may include the object, etc., as described elsewhere herein. In embodiments, the cloud 102 may cause information associated with the object 1312 to be stored, added, and/or deleted from the local database 1304, 1306, 1308, 1310 and/or the global database 110.

The cloud 102 may cause a new object 1312 and/or information associated with the new object 1312 to be added to the local database 1304, 1306, 1308, 1310 and/or to the global database 110. For example, the robot 1302 may obtain an identifier associated with the object 1312 and/or images of the object 1312. The robot 1302 may determine whether the object 1312 is stored in the robot's 1302 local database 1308. If the object 1312 is not stored in the robot's 1302 local database 1308, the robot may search another local database 1310 and/or send the information associated with the object 1312 to the cloud 102. The cloud 102 may receive the information associated with the object 1312 as an input and search the local databases 1304, 1306 to recognize the object 1312. The cloud 102 may additionally or alternatively search the global database 110 to recognize the object 1312, as described in more detail elsewhere herein. If the cloud 102 is unable to recognize the object 1312 (e.g., if the object is a new object that cannot be found in the local database 1304, 1306, 1308, 1310), the cloud may enter the received information that is associated with the object 1312 into one or more of the local databases 1304, 1306, 1308, 1310 and/or global database 110. In embodiments, the cloud 102 may deduce the identity of the object 1312 based on the received information and add the deduced identity to the local database 1304, 1306, 1308, 1310 and/or global database 110. The cloud may also create a historical record or log of the object to indicate when the object was added, the object's location, etc. The cloud 102 may also calculate and enter a probability and/or confidence level that the object 1312 was correctly identified.

In an example, the object 1312 may be a hammer. The robot 1302 may obtain images of the object 1312 and determine that the hammer has certain characteristics including size, shape, color, etc. The robot 1302 may also interact with the object 1312 to determine additional characteristics such as weight, density, materials, etc. In some embodiments, the robot 1302 may attempt to identify the object 1312 using the robot's 1312 local database 1308 without success. Therefore, the robot 1302 may send the information that it obtained about the object 1312 to the cloud 102 for recognition. The cloud 102 may access additional local databases 1304, 1306 and/or the global database 110 to recognize the hammer using contextual and/or situation analysis, for example. In doing so, the cloud 102 may determine that the dimensions of the object 1312 are similar to a wrench. However, the cloud 102 may also determine that the distribution of weight and/or the materials associated with the object 1312 are related to hammers. Thus, the cloud 102 may compare the received information about the object 1312 to all known hammers and wrenches in the local databases 1304, 1306, 1308, 1310 and determine the probability that the object 1312 is in fact a hammer and/or the probability that the object 1312 is a wrench. The cloud 102 may store this information in the local databases 1304, 1306, 1308, 1310 and/or send the data to the robot 1302.

In further embodiments, the robot 1302 may receive the information that the object 1312 is a wrench and instructions that may be executable to treat the object 1312 as a wrench. After attempting to use the object 1312 as a wrench, the robot 102 may send performance information to the cloud 102, which may indicate that the object 1312 performs poorly as a wrench. Using this additional data, the cloud 102 may adjust the probability associated with the object 1312 such that the object 1312 has a higher probability of being a hammer than a wrench, for example. The cloud 102 may update the local databases 1304, 1306, 1308, 1310 with this information and/or send the data to the robot 1302.

In some embodiments, the robot 1300, 1302 and/or cloud 102 may maintain a historical record or log of the object 1312 based on information the robot 1300, 1302 obtained about the object 1312 and/or based on information the cloud 102 deduced about the object 1312. This historical record or log may be stored in one or more of the local databases 1304, 1306, 1308, 1310 and/or the global database 1310. The historical record or log may be updated periodically or intermittently. In some embodiments, a timestamp may be associated with information within the historical record or log. The timestamp may indicate when the information was obtained, added, updated, etc. In some embodiments, the timestamp may also be used to purge information when the information becomes old, outdated, unneeded, etc.

The historical record or log may be used to recognize the object. For example, the cloud 102 may receive inputs from the robot 1302 including images of the object 1312 and the location of the object 1312. The cloud 102 may access the local database 1304, 1306, 1308, 1310 to determine a number of objects 1312 that may be associated with the area. Thus, if the area was a garage, the local database 1304, 1306, 1308, 1310 may indicate that the objects stored in the garage include a wrench, a flathead screwdriver, a Phillips head screwdriver, a hammer, an electronic drill, a number of drill bits, a saw, etc. In some embodiments, the local database 1304, 1306, 1308, 1310 may indicate an aggregated number of wrenches, flathead screwdrivers, Phillips head screwdrivers, hammers, etc. that may be located throughout a plurality of garages in a similar area. The similar area may include garages, sheds, or other work areas in the surrounding area, throughout the country, in random locations throughout the country (e.g., neighborhoods, towns, cities, counties, states, regions, etc.).

The cloud 102 may use the historical record or log to recognize the object based on data from any of the local databases 1304, 1306, 1308, 1310. In some embodiments, the analysis of the historical record or log may be performed as part of the situational analysis. In an example, the cloud 102 may receive the actual or relative location of the object 1312 in addition to the images of the object 1312. The cloud 102 may analyze the historical record or log to determine what object and/or objects have been located at the received location at prior times in the past. Thus, the cloud 102 may determine that a wrench was most recently located at the received location and had been located at the received location for a certain time duration. The cloud 102 may also determine that a wrench, hammer, and screwdriver have all been located at the received location within a predetermined time duration, entries, etc., for example. Thus, the cloud 102 may determine that the object 1312 that has most frequently been located at the received location has been a hammer. Using information in the historical record or log, the cloud 102 may determine the frequency at which objects 1312, such as the hammer, have been located at the received location and provide a weight to one or more of the objects 1312 accordingly. The cloud may also or optionally use the received location to determine a probability that the object 1312 is a hammer, wrench, screwdriver, etc.

In some embodiments, the cloud 102 may also analyze the size and shape of the object 1312 to determine the object's 1312 likely identity. This calculated likelihood may be weighted and combined with the weighted frequency information from the historical record or log to recognize the object 1312, for example. In further embodiments, a number of additional factors may be calculated, weighted, averaged, etc., to perform the object recognition. The additional factors may be obtained from the global database 110 and/or local database 1304, 1306, 1308, 1310, and may include information obtained from contextual and/or situational analysis, for example.

In an example, the cloud 102 may determine that the object 1312 that was most recently located in the received location was a wrench. The cloud 102 may also determine that a hammer has been located at the received location a higher percentage of time than the wrench. Using at least this information, the cloud 102 may determine a probability that the object 1312 is a wrench or a hammer. The cloud 102 may also use the shape and size of the object 1312 to determine the probability that the object 1312 is a screwdriver, wrench, hammer, etc. The cloud may combine the probability based on the historical record or log with the probability based on the shape and size of the object 1312 to determine that the object 1312 has a high probability of being a hammer, a lower probability of being a wrench, an even lower probability of being a screwdriver, a negligible probability of being a screw or a bolt, etc. The cloud may send all or part of this recognition data to the robot 1300, 1302.

In some embodiments, the robot 1300, 1302 may receive data incorrectly recognizing the object 1312 as a first object 1312 (e.g., a wrench) instead of the correct object 1312 (e.g., a hammer), for example. The robot 1300, 1302 and/or user may determine that the recognized object 1312 (e.g., the wrench) may not be able to perform the desired task (e.g., of hammering a nail.) The robot 1300, 1302 may send this information to the cloud 102 along with information associated with the problem that the robot 1300, 1302 encountered. The cloud 102 may receive this information and, in response, update the prior probabilities, update the historical record or log, update the data in the local database 1304, 1306, 1308, 1310 and/or global database 110, etc. In some embodiments, the cloud 102 may also or optionally perform a new object recognition. The new object recognition may utilize the updated probabilities, local databases 1304, 1306, 1308, 1310, and global database 1310. The new object recognition may also include a situational analysis of the received data, such as the robot's 1300, 1302 inability to use the wrench as a hammer, for example.

Figure 14:
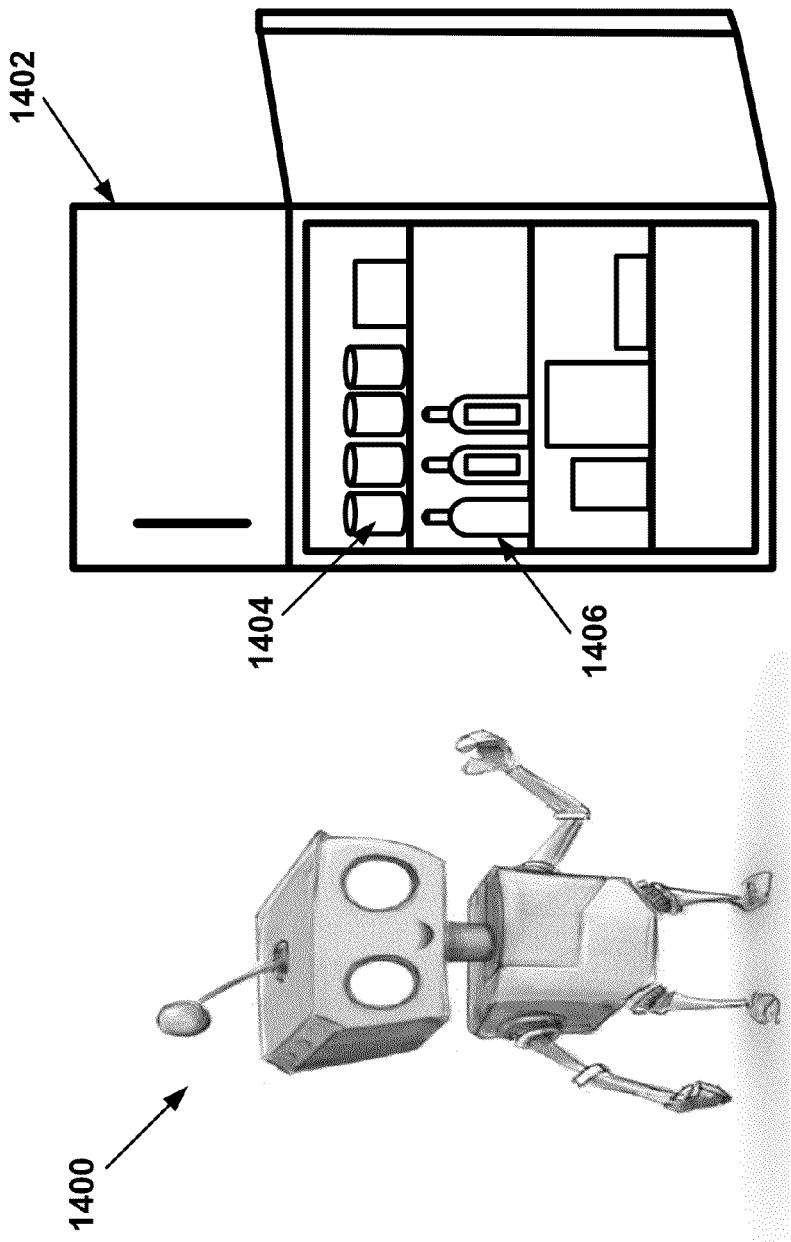
FIG. 14 is an example conceptual illustration of a robot interacting with an object.

FIG. 14 is an example of a conceptual illustration of a robot interacting with an object, in accordance with aspects of the invention. In particular, FIG. 14 includes a robot 1400, refrigerator 1402, cans 1404, and bottles 1406. The cans 1404 and/or bottles 1406 may be of any liquid or other substance storable in cans 1404 and/or bottles 1406, for example. The robot 1400 may interact with one or more of the cans 1404 and/or bottles 1406 by scanning an identifier associated with the cans 1404 and/or bottles 1406, by obtaining an image of the cans 1404 and/or bottles 1406, etc.

In an example, the robot 1400 may scan or otherwise obtain an identifier (e.g., a barcode) on one of the cans 1404. The robot 1400 may compare the identifier associated with one of the cans 1404 to one or more identifiers located in a local database on the robot 1400. In this way, the robot 1400 may recognize the cans 1404 associated with the identifier as soda cans 1404, for example. Additionally or alternatively, the robot 1400 may acquire an image (e.g., with a camera) of the can and compare the image with one or more images located in a local database to recognize the cans 1404 as soda cans.

In some embodiments, the robot 1400 may obtain the identifier and send the identifier to the server. The server may access data located in one or more local databases and determine what object or objects may be associated with the identifier. Based at least in part on this determination, the server may recognize the object associated with the received identifier as soda cans 1404, for example. Additionally or alternatively, the robot 1400 may send the acquired image to the server, and the server may (1) identify the object in the image based on image recognition algorithms implemented by the server, and (2) send the results of the image recognition to the robot 1400.

In further embodiments, the server may determine the probability that the server recognized the object accurately. For example, the probability that the server correctly recognized the object may be 100% when the barcode identifier was fully scanned and when the barcode is unique to a single object. However, if the barcode was partially scanned, then the probability that the server recognized the object may be based on the amount of the barcode that was scanned and the confidence level associated with the portion of the barcode that was scanned, for example. In another example, the probability that the server recognized the object correctly may be lower if the same identifier is associated with multiple different objects. Thus, the probability that the scanned object is a soda can 1404 may be lower if the same identifier is associated with oatmeal, sugar, etc. In such examples, the server may perform contextual analysis to determine the likelihood of the object being a soda can 1404 given that the object is located in the refrigerator 1402 next to bottles 1406, for example. The server may use the probability to aid in recognizing the object and, in some embodiments, may send information associated with the recognized object to the robot 1300.

In yet further embodiments, the robot 1400 may receive a command to perform a task. As an example, the user may give an oral command or electronic command (e.g., via a computing device) to the robot 1400 to "retrieve a soda from the fridge." The robot 1400 may receive the command to "retrieve a soda from the fridge." If the robot 1400 includes a local database of objects, the robot may parse the command for words that may or may not be used to describe objects in the local database. The robot 1400 may then compare the parsed words to objects in the local database to determine if the command includes one or more objects and if any or all of the objects in the command is located in the database. Thus, the robot 1400 may parse the command "retrieve a soda from the fridge" and determine that "soda" and "fridge" may be objects. The robot 1400 may search the local database and determine that "soda" may be related to a "soda bottle" or a "soda can." The robot 1400 may also search the local database for "fridge" and be unable to find a match, for example. The robot 1400 may send the command and any identified or candidate objects to the server. In some embodiments, the robot 1400 may forego parsing the command and identifying object and, instead, send the command to the server to parse. This may occur when the robot 1400 does not have a local database, has a local database that may not be frequently updated, has relatively few computing resources available to perform the recognition, etc.

The server may receive the command and the identified or candidate objects from the robot 1400. Alternatively, the server may receive the command and may parse the command and search in one or more local databases to determine if the server can identify the objects in the command. For example, the server may access a local database that includes one or more aliases associated with the word "fridge" and determine that a "fridge" may be akin to a "refrigerator." The server may also access a local database to determine that the word "soda" may be associated with a "soda bottle" or a "soda can."

Based on the information obtained from the robot 1400, the server may determine the probability that it has correctly determined the objects in the command (e.g., the soda and the fridge) that need to be acted upon to carry out the command. In some embodiments, this probability may be compared to a threshold level. If the probability meets or exceeds the threshold, the server may send instructions to the robot 1400 to perform appropriate steps to execute the command. For example, the server may instruct the robot to (1) travel from its current location to the refrigerator, (2) open the refrigerator door, (3) grasp and remove a particular soda can from a shelf in the refrigerator, (4) close the refrigerator door, (5) travel from the refrigerator to the location of the user who asked the robot to "retrieve a soda from the fridge," and (6) present the soda can to the user. If the probability does not exceed the threshold, the server may perform additional analytics, query the user (via the robot 1400 or other communications mechanisms), obtain additional data about the object's and/or robot's environment, etc., until the threshold is met. If the server remains unable to recognize the object to a high enough probability to pass the threshold, then, after a period of time and/or a number of determination iterations, the server may conclude that the correct object is the object having the highest probability out of a set of candidate objects, for example.

In some embodiments, a confidence interval may be used instead of or in addition to a probability. The confidence interval may indicate how confident the server is that it correctly identified the object. A confidence interval threshold may be used to determine if the confidence interval meets or exceeds a desired level. If the confidence level meets or exceeds the desired level, the server may instruct the accordingly based on the identified or candidate object. If the confidence level is below the desired level, the server may perform additional analytics and/or calculations, obtain additional information, etc., until the confidence interval meets or exceeds the desired level. If the server is unable to reach a high enough confidence interval, then, after a period of time and/or a number of iterations, the server may conclude that the correct object is the object having the highest confidence interval of a set of candidate objects, for example.

A number of analytics may be performed to aid the server in recognizing the object. An example analytic may be a contextual analysis. A contextual analysis may include the robot's 1400 and/or the object's surroundings, relationship with other objects, location, etc. In an example, contextual analysis may be used to determine that the refrigerator 1402 may be located relatively close to the robot 1400 and/or to the user. From this, the server may deduce that the refrigerator 1402 is the "fridge" that was included in the user's command. In some embodiments, the server may identify and send instructions to the robot that cause the robot to go to the recognized object (e.g., the refrigerator 1402). These instructions may also instruct the robot 1400 to open the refrigerator 1402 door and look inside the refrigerator 1402, Contextual analysis may also be used to determine that both bottles 1406 and cans 1404 are located in the refrigerator 1402. For example, the server may use contextual analysis to determine that the bottles 1406 in the refrigerator 1402 are 1.25 liter sizes and that no soda bottles 1406 in the local databases are 1.25 liters in size. From this information, the server may deduce that the 1.25 liter bottles 1406 have a low probability of being soda. The server, however, may determine that the cans 1404 may be soda cans and assign a probability that the cans 1404 are soda cans accordingly.

Additional analytics, such as situational analysis, may be used to recognize the object, an interaction with the object, a use of the object, a meaning of a command or word within the command, etc. In an example, the server may have identified the "fridge" as the refrigerator 1402 and the "soda" as a can 1404 of soda. However, the server may need to perform situational analysis to recognize or deduce a meaning to the command "retrieve a soda from the fridge." In some embodiments, the server may recognize or deduce the meaning of the word "retrieve" by searching the global database for interactions that the robot has had with the "soda" and "fridge." From this, the server may determine that the robot's 1400 most frequent interactions with the "fridge" are to open or close the refrigerator 1402 door. The server may also determine that the most frequent interactions with the "soda" is to pick up a single can 1404 of soda, put multiple cans 1404 of soda in the refrigerator 1402, or to move one or more cans 1404 of soda from one location in the refrigerator 1402 to another, for example. From this, the server may determine that, absent any numerical indicators, the word "me" may suggest that the user may want a single soda. The server may also determine that "retrieve" is frequently used in commands where the user or other users want an object brought to the user instead of taken from the user. Using this information, the server may assign a probability to one or more of the possible interactions.

Interactions may be associated with one or more computer executable instructions. In some embodiments, the server may identify one or more computer executable instructions that may be associated with the most probable interaction and/or with multiple probable interactions. The server may send the identified computer executable instructions to the robot 1400, which may execute the instructions to perform a task (e.g., retrieving the soda from the fridge). In embodiments, the robot 1400 may provide feedback as to the success and/or failure of the received instructions. The success and/or failure of the instructions to perform the task may be used to update the instructions, local databases, global data, and recognition algorithms, for example.

6. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
   receiving, from a robot having at least one sensor, a query comprising:
   identification data obtained by the at least one sensor and associated with an unidentified object,
   contextual data obtained by the at least one sensor and associated with a location of the unidentified object, and
   situational data comprising a command obtained by the at least one sensor at a time proximate to the contextual data being obtained;
   identifying a plurality of candidate objects based on the identification data;
   making a determination of whether the unidentified object is an identified object in the plurality of candidate objects based at least in part on the contextual data and the situational data; and
   sending data associated with the identified object to the robot based on the determination.

2. The method of claim 1, wherein the identification data is one of (i) information read from a code, a tag, or a beacon associated with the unidentified object, (ii) an image of the unidentified object, and (iii) a name of the unidentified object.

3. The method of claim 1, wherein the contextual data is further associated with at least one of (i) location data associated with the robot, and (ii) information associated with other objects within a predetermined distance of the unidentified object.

4. The method of claim 1, wherein the situational data further comprises action data associated with an action performed by the robot at the time proximate to the contextual data being obtained.

5. The method of claim 1, wherein each of the plurality of candidate objects has a probability of correctly corresponding to the unidentified object, the method further comprising:
   selecting one candidate of the plurality of candidate objects as the identified object based on the selected candidate's probability of correctly corresponding to the unidentified object.

6. The method of claim 1, wherein the data associated with the identified object includes at least one of (i) an identifier associated with the identified object, (ii) one or more physical characteristics of the identified object, and (iii) one or more instructions for interacting with the identified object.

7. The method of claim 1, further comprising:
   receiving feedback associated with the identified object from the robot, wherein the feedback confirms or corrects the data associated with the identified object that was previously sent to the robot; and
   updating the data associated with the identified object based on the feedback.

8. The method of claim 7, further comprising:
determining whether the identified object correctly corresponds to the unidentified object associated with the query received from the robot based on the feedback data; and
sending a new identified object to the robot in response to determining that the identified object does not correctly correspond to the unidentified object associated with the query received from the robot.

9. The method of claim 7, further comprising:
storing details of the query received from the robot, the identified object, and the feedback data in a history log associated with the identified object.

10. The method of claim 7, wherein the query from the robot is based on a command received by the robot from a user associated with the robot.

* * * * *